April 13, 1948.　　　　P. F. GOOD　　　　2,439,464
BATTERY CONTAINER FOR AIRPLANES
Filed Jan. 3, 1947　　　3 Sheets-Sheet 1

Inventor
PAUL F. GOOD

By Donald W. Farrington
Attorney

April 13, 1948.  P. F. GOOD  2,439,464
BATTERY CONTAINER FOR AIRPLANES
Filed Jan. 3, 1947    3 Sheets-Sheet 2

ELASTIC MEMBER ATTACHED TO AIRPLANE

Inventor
PAUL F. GOOD
By Donald W. Farrington
Attorney

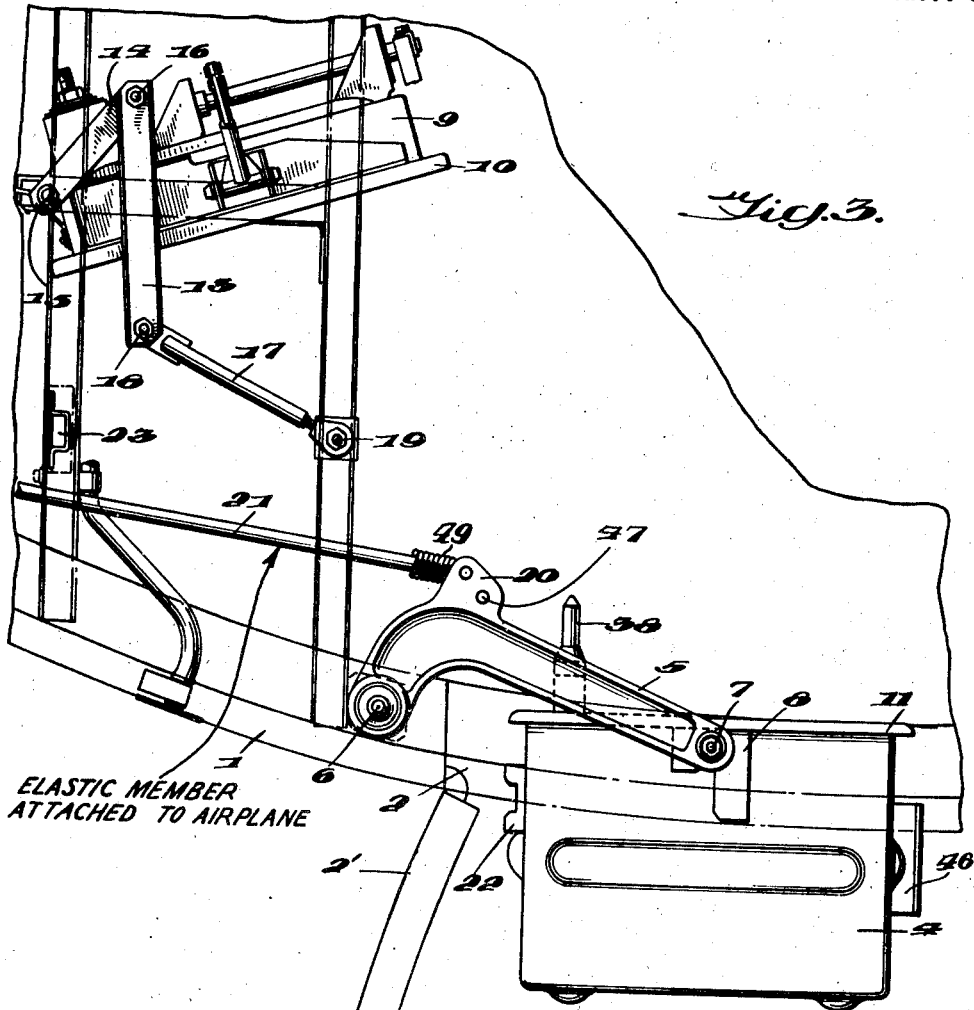
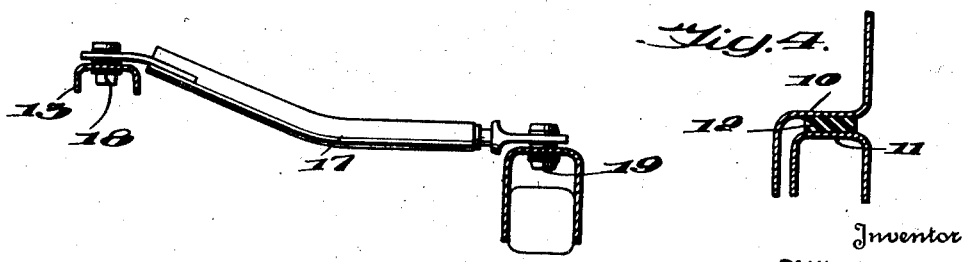

Patented Apr. 13, 1948

2,439,464

UNITED STATES PATENT OFFICE 2,439,464

BATTERY CONTAINER FOR AIRPLANES

Paul F. Good, Baltimore, Md., assignor to The Glenn L. Martin Company, Middle River, Md., a corporation of Maryland Application January 3, 1947, Serial No. 720,093

6 Claims. (Cl. 136—171)

This invention relates to an improved battery installation in a vehicle to render it more accessible for service and replacement.

In every type vehicle employing a storage battery, the installation and service of the battery presents a problem because of the great weight of storage batteries and the difficulty involved in handling them.

In aircraft, the battery installation is even more of a problem. The battery must be readily accessible for service and replacement with a minimum of delay and, due to the great weight of the battery and the inherent weakness of aluminum, the battery installation must be such that it cannot damage surrounding aircraft structure during installation. Because of the corrosive effect of the battery fumes during charging, the battery must be totally enclosed in a container that must be vented outside the aircraft. The container must have mechanical strength to support the weight of the battery as well as hold the battery firmly in place in the event of high impact loads upon landing.

It is an object of this invention to provide a battery installation that is enclosed within a housing when in the operative position within the airplane or vehicle, but which can readily be moved to a position outside the vehicle for servicing and replacement.

It is another object of this invention to provide a battery installation in which the battery is sealed in a housing except for a breather pipe connected exteriorly of the vehicle or airplane, and one in which the battery can be removed from the operative position to a servicing position without first electrically disconnecting the terminals.

It is another object of this invention to provide a battery installation in which the battery may be placed within a box or carrier outside the vehicle and readily rotated into position in the structure, electrically connected, covered, and locked in place in the operative position.

Further and other objects of this invention will become apparent from the description of the accompanying drawings which form a part of this disclosure and wherein like numerals refer to like parts.

Figure 3 shows the battery carrier assembly of Figure 2 in the open position.

Figure 4 is a fragmentary view of the battery carrier showing the cover seal.

Figure 5 is a sectional plan view of the box cover operating linkage.

Figure 1:
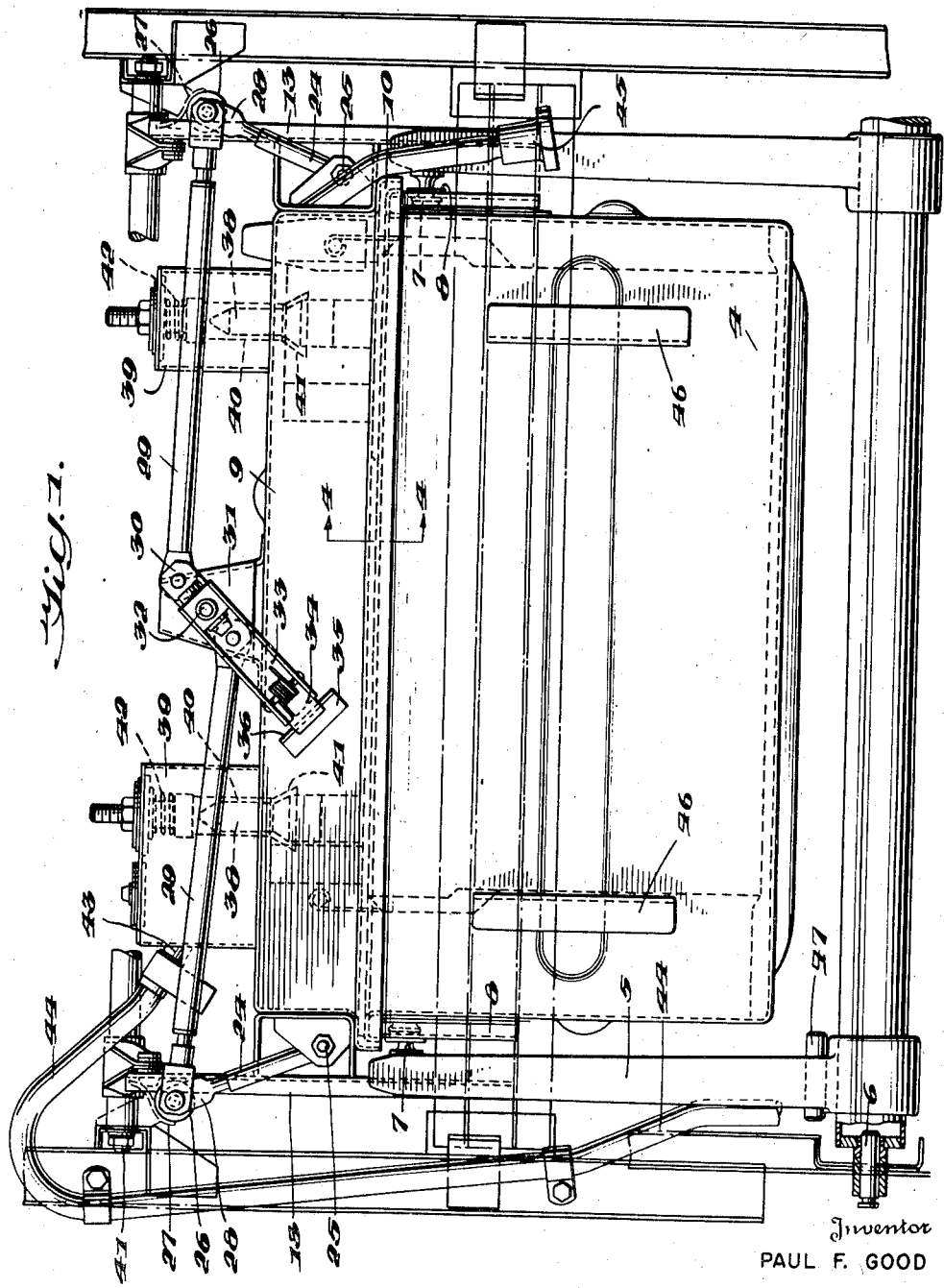
Figure 1 is a front view of the battery carrier assembly.

The battery carrier illustrated in the drawings is intended to securely house the battery within the fuselage of the airplane in a sealed container but provide quick and ready removal of the battery from the airplane for service and maintenance. The fuselage or wall construction of the airplane is shown at 1 having an opening 2 at the bottom thereof through which the battery carrier may be extended so that the battery may be replaced or serviced. Opening 2 has an access door 2' formed in the skin thereof. The battery 3 is supported in container 4 by levers 5. The lower ends of levers 5 are pivoted to the aircraft structure at 6. The upper ends of levers 5 carry pivotal connection with the box consisting of knobs 7 that engage slotted brackets 8 mounted on the ends of box 4. This structure permits box 4 to rotate freely as levers 5 move the box from the retracted to the extended position, yet permit the box to be readily disengaged from the installation. Cover 9 is provided for box 4. The edges of the cover and the box are flanged as shown at 10 and 11 and a resilient gasket 12 seals the adjacent edges of the box and the cover. Cover 9 has strips 13 rigidly affixed to each end of the cover. Linkage 14 has one end thereof pivoted at 15 to the airplane structure and the other end pivoted at 16 to strip 13. Linkage 17 has one end pivoted at 18 to strip 13 and the other end pivoted at 19 to the airplane structure. This linkage structure is also shown in Figure 5.

It will be seen from the above description that cover 9 may be lifted from box 4 with the aid of strip 13 and the linkages 14 and 17 with a motion that is initially substantially vertical, but the action of the linkages 14 and 17 cause the cover to tilt upon continued upward motion. When the cover is so removed from the box, the battery carrying box may be pivoted forwardly and downwardly on levers 5 about pivot point 6 until the box and battery extend through the opening in the lower portion of the skin of the airplane. The box 4 by reason of bracket 8 and pin 7 may be lifted off levers 5. Levers 5 have projecting lug 20 to which a spring or elastic member 21 is attached having one end secured to the airplane structure, to counterbalance the weight of the battery and box as it is being pivoted forwardly for extension through aperture 2. Elastic member 21 has a conventional wire wound terminal 49 for attachment to lug 20.

Figure 2:
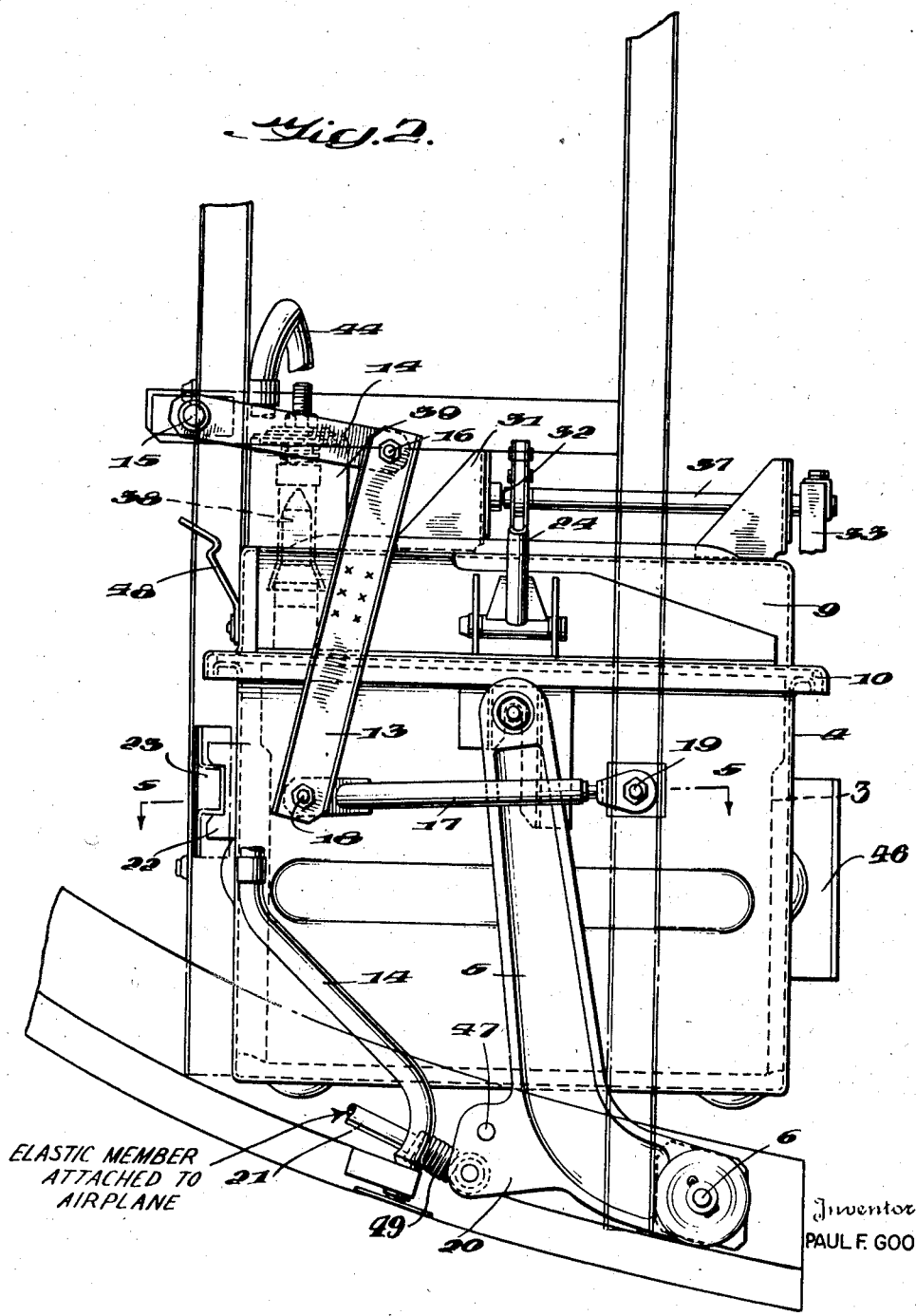
Figure 2 is a fragmentary view showing the skin of the airplane in the relationship of the battery carrier assembly.

Due to the vibration of the airplane, it is necessary that the battery carrier assembly be secured in the airplane structure against the vibration. It will be noted that in the position within the airplane the battery carrier is supported by pins 7 which are "over dead center" with respect to pivot point 6 (Fig. 2). Therefore, the weight of the box and battery will then produce a counter clockwise motion about pivot point 6. In this position, member 22 secured to box 4 interlocks with member 23 secured to the airplane structure to prevent the battery box from pivoting on pins 7. In other words, members 22 and 23 act as locaters for the box and battery within the airplane.

Cover 9 has a locking assembly which consists of levers 24 pivoted on the cover assembly at 25. Levers 24 carry on their upper ends rollers 26 which in the operative position engage a cam member 27 which is mounted on the aircraft structure. Roller 26 is supported between the forks of member 28 which is secured in the end of lever 24. Links 29 have one end pivoted coaxial with the roller 26 or pivoted on lever 24. The other ends of links 29 are pivoted on member 30 which is secured to the cover structure by bracket 31 and pivots thereon about point 32. Member 33 forms an extension of member 30 and functions as an operating handle to turn member 30 about pivot point 32. A spring-urged catch 34 is mounted on handle 33 and cooperates with bracket 35. The end of catch 34 is retained in cut-out 36 in bracket 35 to prevent inadvertent displacement of the handle.

It will be seen from the above described structure that handle 33 and member 30 operate to push links 29 and thereby the rollers supported on the ends of members 24 under cams 27. This prevents any upward displacement of the cover and box assembly as rollers 26 bear against cams 27. Since cams 27 are secured to the aircraft structure, a downward component is exerted through rollers 26 and lever 24 through pivot point 25 which presses the cover firmly against box 4 and compresses gasket 12 to effect a seal between the cover and the box, while retaining the cover and box assembly firmly fixed within the airplane. For convenience, handle 33 is located on the front of the cover assembly and the torque is transmitted through rod 37 to member 30. Push rods 29 are located on the center line of the box as only one cam on each side of the box is necessary to secure the assembly.

The terminals on the battery are fitted with plugs 38 that extend up into the cover assembly. Housings 39, secured to the cover over the terminals 38, each has a receptacle 40 to receive a terminal 38. The flared ends 41 provide for interengagement of the terminals and receptacles in the event of misalignment. Spring 42 causes each terminal and receptacle to engage with the proper amount of pressure to insure good electrical contact. The battery carrier assembly is vented through tube 43 on the side of housing 39 and hose 44 connected to member 43.

To remove or fix the battery installed in the airplane, catch 34 is removed from cut-out 36 in member 35. Handle 33 is moved counter clockwise about pivot 32 to rotate member 30 which moves links 29. Links 29 move inwardly toward the center of the box, thus moving rollers 26 out of engagement with cams 27. The cover is then free to be moved upwardly by handle 45. The cover is moved on linkages 13, 14 and 17 about pivot points 15 and 19 initially vertically upwardly and then tilted to afford ample clearance for motion of the battery carrier. Spring clip 48 engages pivot 15 to hold cover 9 in the open position. The initial vertical upward motion of the cover assembly disengages terminals 38 from receptacle 40. Battery box 4 may then be pivoted on levers 5 forwardly as described above, counterbalanced at all times by the resilient member 21. Handles 46 are provided on the box to move it on levers 5. Locking pin 47 is provided on lever 5 to hold it in the extended position when it is necessary to remove battery box 4 from the levers.

It is to be understood that certain changes, alterations, modifications and substitutions can be made without departing from the spirit and scope of the appended claims.

I claim as my invention:

1. A battery installation for an airplane fuselage including a battery, a battery box and cover separately mounted in the fuselage and so positioned that the cover engages the box and forms a gas-tight container for said battery, a vent line affording communication between said container and the exterior of said fuselage, said cover being mounted on linkage means that permit the cover to be disengaged from said box and retained in said fuselage, said box being supported on a pair of pivoted levers that swing the box from the cover-engaging position to a position outside said fuselage, means to lock said levers when said box is in said last named position, while said battery box is disengaged from said supporting levers for servicing or replacement of the battery.

2. A battery installation for an airplane fuselage having a battery access opening formed therein, including a battery, a battery box and cover separately mounted in the fuselage and so positioned that the cover engages the box and forms a gas-tight container for said battery, said cover being removable from said box, locater and stop brackets mounted on said box and said fuselage to position said box in the cover-engaging position within the fuselage, said battery box being pivotally supported on the upper ends of a pair of levers, the lower ends extending below the box being pivoted to the airplane structure, the lower pivot points being so located that the box can be moved on said levers from the cover-engaging position, through said access opening in said fuselage, to a position below said fuselage for servicing said battery.

3. A battery installation for an airplane fuselage having a battery access opening formed therein, including a battery, a battery box and cover separately mounted in the fuselage and so positioned that the cover engages the box and forms a gas-tight container for said battery, said cover being removable from said box, locater and stop brackets mounted on said box and said fuselage to position said box in the cover-engaging position within the fuselage, said battery box being pivotally supported on the upper ends of a pair of levers, the lower ends extending below the box being pivoted to the airplane structure, the lower pivot points being so located that the box can be moved on said levers from the cover-engaging position, through said opening in said fuselage, to a position below said fuselage for servicing said battery, and resilient members secured to said levers and said fuselage to counter-balance the weight of said battery box.

4. A battery installation for an airplane fuselage having a battery access opening formed therein, including a battery, a battery box and cover separately mounted in the fuselage and so positioned that the cover engages the box and forms a gas-tight container for said battery, a locater and stop bracket mounted on said box and said fuselage to position the box in the cover-engaging position within the fuselage, said battery box being pivotally supported on a pair of levers, so constructed and aranged to extend the battery box through said opening in the bottom of the fuselage, said cover being movably supported on a linkage mechanism so constructed and arranged that the box cover moves initially vertically and subsequently tilts to the open position, said battery having terminals extending upwardly into the cover, receptacles mounted on said cover to engage said terminals, said terminals and receptacles being electrically disconnected by the open movement of said cover.

5. A battery installation for an airplane fuselage having a battery access opening formed therein, including a battery, a battery box and cover separately mounted in the fuselage and so positioned that the cover engages the box and forms a gas-tight container for said battery, a locater and stop bracket mounted on said box and said fuselage to position the box in the cover-engaging position within the fuselage, said battery box being pivotally supported on the upper ends of a pair of levers, the lower end thereof being pivoted to the airplane fuselage, the pivot points being so located that when the box is in the cover-engaging position within the fuselage, the center of gravity is above the pivot points of said levers on said fuselage and between said last mentioned pivot points and said locater and stop so that the box must be moved in an arc upwardly about the pivot points of the levers from the operative position over the pivot points and downwardly until the levers extend the battery box through said opening in the bottom of the fuselage, said cover being movably supported on a linkage mechanism so constructed and arranged that the box cover moves initially vertically and subsequently tilts to the open position, a cam mechanism on said fuselage and cover to hold the cover firmly against said box, to prevent inadvertent displacement of said battery box.

6. A battery installation for an airplane fuselage having a battery access opening formed therein, including a battery, a battery box and cover separately mounted in the fuselage and so positioned that the cover engages the box and forms a gas-tight container for said battery, a locater and stop bracket mounted on said box and said fuselage to position the box in the cover-engaging position within the fuselage, said battery box being pivotally supported on the upper ends of a pair of levers, the lower end thereof being pivoted to the airplane fuselage, the pivot points being so located that when the box is in the cover-engaging position within the fuselage, the center of gravity is above the pivot points of said levers on said fuselage and between said last mentioned pivot points and said locater and stop so that the box must be moved in an arc upwardly about the pivot points of the levers from the operative position over the pivot points and downwardly until the levers extend the battery box through said opening in the bottom of the fuselage, said cover being movably supported on a linkage mechanism so constructed and arranged that the box cover moves from a box-engaging position, initially vertically and subsequently tilts to the open position, said battery having terminals extending upwardly into the cover, receptacles mounted on said cover to engage said terminals, the opening movement of the cover electrically disconnecting said terminals and releasing said battery box for movement out of said fuselage.

PAUL F. GOOD.

REFERENCES CITED

The following references are of record in the file of this patent:

UNITED STATES PATENTS

| Number | Name | Date |
|---|---|---|
| 1,993,893 | Page | Mar. 12, 1935 |
| 2,242,201 | Woods | May 13, 1941 |

FOREIGN PATENTS

| Number | Country | Date |
|---|---|---|
| 593,012 | France | May 13, 1925 |